United States Patent

[11] 3,631,899

[72] Inventor Merle L. Erickson
Saint Anthony, Minn.
[21] Appl. No. 878,546
[22] Filed Nov. 20, 1969
[45] Patented Jan. 4, 1972
[73] Assignee Minnesota Mining and Manufacturing Company
St. Paul, Minn.
Continuation-in-part of application Ser. No. 513,428, Dec. 13, 1965, now abandoned. This application Nov. 20, 1969, Ser. No. 878,546

[54] HEAT-SHRINKABLE FILM AND TUBING
7 Claims, No Drawings
[52] U.S. Cl..................................................... 138/171,
138/178, 161/46, 161/402, 264/289
[51] Int. Cl......................................................... B65b 53/00
[50] Field of Search............................................. 138/118,
171, 178; 161/46, 402; 264/289; 285/381, DIG.
10; 156/84, 86

[56] References Cited
UNITED STATES PATENTS

| | | | |
|---|---|---|---|
| 2,784,456 | 3/1957 | Grabenstein | 138/178 |
| 2,851,733 | 9/1958 | Pangonis et al. | 264/289 |
| 2,876,067 | 3/1959 | Nagel et al. | 161/Shrink Film DIG. UX |
| 2,928,132 | 3/1960 | Richards | 264/289 UX |
| 3,312,250 | 4/1967 | Sirignano et al. | 138/171 |

OTHER REFERENCES

Lowrey, R. D., Shrink Packaging Grows, in Modern Packaging Vol. 40, No. 4A p. 268– 274, Dec. 1966.

Sweeting, O. J., The Science and Technology of Polymer Films, John Wiley & Sons, 1968, p. 460– 464, 523, 537– 538

Primary Examiner—Edward J. Earls
Attorney—Kinney, Alexander, Sell, Steldt & Delahunt ABSTRACT: Heat-shrinkable films and heat-shrinkable tubing of linear polymeric esters that shrink at least 2½ times as much along one of the longitudinal and transverse axes of the films and tubing as they do along the other. The films and tubing shrink between 2 and 20 percent in the direction of least shrinkage and at least 20 percent in the direction of most shrinkage. A film of the invention is prepared by stretching it in a first direction at a temperature that is above the second order transition temperature for the polymer of the film, then thermally conditioning the film while it is in the stretched condition by heating it for several seconds at a temperature that is at least 5° C. above the first temperature, and then stretching the film in a second direction perpendicular to the first direction at a temperature at least 5° C. above the first temperature.

HEAT-SHRINKABLE FILM AND TUBING

REFERENCE TO RELATED APPLICATION

This application is a continuation-in-part of the application Ser. No. 513,428, filed Dec. 13, 1965, now abandoned.

BACKGROUND OF THE INVENTION

Heat-shrinkable polyethylene terephthalate film has recognized properties that have led others to incorporate it in thin wall heat-shrinkable tubing useful for such functions as electrical insulation, physical protection, and closure seals. In one commercial form a narrow strip of heat-shrinkable polyethylene terephthalate that has balanced length and width shrinkage has been spirally wrapped and adhesively bonded into tubing that exhibits a substantial longitudinal as well as radial shrinkage. This characteristic of balanced shrinkage, however, plus a tendency for the tubing to distort on shrinkage has made it difficult to provide a smooth, tight covering on objects. Further, the large longitudinal shrinkage requires use of tubing longer than the article to be covered and makes it difficult to choose the right length of tubing.

Others have suggested cylindrically folding about the longitudinal axis a strip of heat-shrinkable polyethylene terephthalate film that has been oriented in the transverse direction only. When exposed to heat this film shrinks substantially more in the direction of orientation, which is the radial direction when the film is formed as tubing; see Grabenstein, U.S. Pat. No. 2,784,456. This tubing has the advantage of low longitudinal shrinkage but also has the disadvantages of low tensile strength in the longitudinal direction and a marked tendency toward fibrillation, and so far as is known, has never been marketed.

What has been needed to provide high-strength heat-shrinkable tubing with desirable shrinkage characteristics is a film that has not previously been available, namely, a biaxially oriented film that has high shrinkage in one direction (at least about 20 percent) and low shrinkage in the other direction (at least less than 20 percent) and shrinks at least 2½ times more in the first direction than in the second direction. Tubing made by radially folding such a film about its longitudinal axis would have the characteristics needed for shrinking the tubing around, for example, a metal-can-enclosed electrical capacitor, a bundle of cables, or a cable splice. Generally some minimum longitudinal shrinkage, as about 2 or preferably 5 percent, is needed to obtain the best results; such shrinkage is needed, for example, for the ends of the tubing to shrink down and cover the transverse ends of a can-enclosed capacitor.

No prior biaxially oriented polyethylene terephthalate film has ever exhibited such properties. A typical previous heat-shrinkable biaxially oriented polyethylene terephthalate film is described in Nagel, U.S. Pat. No. 2,876,067. The film taught in that patent, which is a nonheat-set polyethylene terephthalate film prepared by stretching the film 3 times in each direction, shrinks when immersed in boiling water in the neighborhood of 25 percent in the first direction of stretch and about 50 percent in the second direction of stretch. Richards, U.S. Pat. No. 2,928,132, suggested substantially reducing the amount of the first direction stretch to make polyethylene terephthalate film having balanced shrinkage. But, insofar as is known, no one has previously suggested film that has the kind of highly imbalanced controlled shrinkage described above, and no one has previously suggested how to make such a film.

SUMMARY OF THE INVENTION

The present invention provides flexible, tough, high-strength biaxially oriented film, and tubing made from that film, that is biaxially differentially heat-shrinkable within a wide range of proportions. More specifically, the heat-shrinkable film of this invention comprises a flexible, tough, biaxially oriented film of linear, orientable, crystallizable, heat-settable polymeric ester, which film is nonfibrillating and has a tensile strength in the mutually perpendicular directions of at least 10,000 pounds/square inch, and at about 150° C. (300° F.) has a heat shrinkage in the first of the mutually perpendicular directions of between about 2 and 20 percent and at least 20 percent in the second direction and shrinks at least about 2½ times, and preferably at least 3 times, as much in the second direction as in the first direction. (By heat-settable polymer is meant a crystallizable polymer, which when in an oriented film or fiber form, can be heated to a temperature above the orientation temperature but below the polymer's crystalline melting point to reduce shrinkage at temperatures below the temperature of heating without substantially reducing the tensile strength of the film.)

This novel film is prepared by accompanying the different axial orientations of the film with different thermal conditioning. The film is stretched in a first direction, then partially heat-set or thermally relaxed while it is maintained in a stretched condition, then preferably cooled, and then stretched again in the second direction. The film may then be again partially heat-set or thermally relaxed to further modify the amount of shrinkage in the final film.

As a result of the thermal conditioning of the film after the first axial stretch, the biaxially oriented film develops a large difference in the axial forces of recovery that are exerted when the film is heated. It is theorized that heating the film after the first stretching operation while it is in an extended condition produces changes in the crystallinity of the film that in turn reduce the amount of shrinkage that the film exhibits in the first direction when heated. By the same token it is surmised that as a consequence of the increased crystallinity of the film, more work is required to stretch the film in the second direction. The increased work is in turn realized as an increased force of recovery in that direction that leads to a further difference in the mutually perpendicular amounts of shrinkage.

Heat-shrinkable tubing is made from the novel film of this invention by cylindrically folding strips of the film about their longitudinal axis and then bonding the overlapped edges of the film. Preferably the overlaid edges of the film are welded by the mechanical impacts of a hammer oscillating at an ultrasonic frequency. Welds prepared in this manner have been found to avoid the puckering and distortion that occur with heat-sealing methods used in the past and have been found to give welds of much higher strength, in fact, of a strength nearly equal to that of the film itself. Tubing is prepared from film having the shrinkage characteristics described above, and preferably from film that shrinks between about 40 and 50 percent in the width direction and between about 5 and 20 percent in the length direction. Tubing of the invention may also be made by extruding a tube and subjecting it to the stretching and thermal-conditioning operations described above.

DETAILED DESCRIPTION

Polyethylene terephthalate is especially well-adapted to the processes of this invention and finds wide useful applications after preparation. However, biaxially differentially heat-shrinkable film and tubing are formed by the processes of this invention from other valuable linear, orientable, crystallizable, heat-settable polymeric esters, which are defined for the purposes of this specification, as those polymeric esters in which dibasic acids such as terephthalic, isophthalic, sebacic, bibenzoic, and 2,6-naphthoic acid are a principal acid component.

The biaxially differentially heat-shrinkable film is typically prepared on conventional continuous line apparatus in which the film is first extruded on a rotating drum and stretched in the machine direction with a conventional length orienter that includes initial, slowly driven rolls; a bank of idler rolls; and terminal, fast-driven rolls, and in the transverse direction in a conventional tenter in which the film is held by clamps carried on chains travelling on diverging tracks. The film may be passed through either the length orienter or the tenter first depending upon whether film that is preferentially shrinkable in the machine direction or the transverse direction is desired. In between travel through the first and second stretching stations the film travels for several seconds through an oven in which hot air is forced on the film while it is held in its extended condition. Preferably the film is cooled after leaving the intermediate oven, as by passage under high-velocity air-impingement nozzles. As noted above, the film may also be passed through an oven after the second stretching operation, where it is partially heat-set or thermally relaxed again to further control the amount of shrinkage in both directions of the film.

During the first stretching operation the film is generally heated to a temperature above, but not more than 25° C. (45° F.) above, the second order transition temperature. (Unless otherwise specified, the temperatures used in discussing the film processing are ambient temperatures, that is, the temperature of the atmosphere surrounding the film or the temperature of rolls contacting the film, such as the rolls of a length orienter.) For the best width-shrinkable polyethylene terephthalate film having a minimum length shrinkage, the rolls of the length orienter should not be heated to a temperature more than a few degrees higher than 85°C. (185° F.).

The duration and temperature of the intermediate partial heat-setting operation are determined by the degree of imbalanced shrinkage desired and also by the difficulty in uniformly stretching the film after this operation. In general, the film is heated in an oven for several seconds (4–5 seconds being a typical period of time) at a temperature at least about 5° C. (10° F.) above, and preferably at least 10° C. (20° F.) above, and less than 25° C. (45° F.) above the temperature at which the film was stretched in the first direction. Preferably, the film is then cooled by blowing over it air at high velocity that is at a temperature below the first orientation temperature. The second stretching step should be performed at a temperature at least 5° C. (10° F.) above the temperature of the first stretching operation to give a good film with imbalanced shrinkage. However, the film should not be heated to a temperature above about 130° C. (270° F.) and preferably not above about 120° C. (250° F.), during the second stretching operation to assure that the film will exhibit the desired heat-shrinkage characteristics at practical shrinking temperatures. For the best width-shrinkable polyethylene terephthalate film, the film is preferably not heated during the second stretching operation more than about 20° C. (35° F.) above the temperature of the first stretching operation.

Though it is difficult to prepare satisfactory biaxially oriented biaxially differentially heat-shrinkable polyethylene terephthalate film by stretching the film 2 times or less in the first direction, satisfactory results are obtained when the film is stretched greater than 2 times but not more than about 3½ times in the first direction and between about 2 times and 4 times in the second direction. To obtain the greatest imbalance of shrinkage for width-shrinkable polyethylene terephthalate film, the film is stretched between about 2.6 and 3.2 times in the machine direction, and then stretched in the transverse direction some amount less, preferably 10 percent less, than the amount of stretch in the first direction. If the film is first stretched in the transverse direction, on the other hand, it is preferably stretched between about 2.8 and 3.3 times in the transverse direction and between about 2.8 and 3.2 times in the machine direction.

The invention is further illustrated in the following examples.

EXAMPLES 1–6

In these examples polyethylene terephthalate film was extruded in a 16-mil (0.4 millimeter) thickness onto a rotating drum and then length oriented in a length orienter, heated in an intermediate oven while in the stretched condition, cooled under air-impingement nozzles, and width oriented in a tenter. The temperature conditions and stretch ratios are given in the following table together with the shrinkages in air at 150° C. for each of the films and the shrinkages in boiling water for some of the films. Also given are the film temperatures at the beginning and end of the divergent (stretching) sections of the tenter, measured with a Model IT-3X/3° Barnes Engineering Co. infrared thermometer. Stretch ratios for the transverse stretch were determined by measuring the distortion of a 10-inch-square grid marked on the film after is had passed through the length orienter.

Test results for comparative examples A and B are also included in the table to show the differences between the shrinkage characteristics of a film of this invention and the previously discussed prior art heat-shrinkable films, that is, the non-heat-set films of U.S. Pat. Nos. 2,876,067 and 2,928,132. These films were made on equipment as described above and with the processing conditions set out in the table; polyethylene terephthalate was extruded onto the rotating drum in a 9.7-mil thickness for the example A film and in an 8-mil thickness for the example B film. As seen from the table, films of the invention have a high imbalance of shrinkage in boiling water as well as at 150° C. adapting the films to uses in which shrinkage is obtained by immersion in boiling water; generally, films of the invention shrink in boiling water at least 2½ times more in one direction than in the other mutually perpendicular direction.

| | Length-stretch ratio | Width-stretch ratio | Ambient temperatures (° C.) | | | | Film temperatures during transverse stretch-° C. | | Shrinkages in boiling water (percent) | | Shrinkages at 150° C. (percent) | |
|---|---|---|---|---|---|---|---|---|---|---|---|---|
| | | | Length-orienter | Intermediate oven | Cooling blower | Tenter | Start | End | Length | Width | Length | Width |
| Example: | | | | | | | | | | | | |
| 1 | 2.7 | 2.3 | 85 | 108 | 80 | 91 | 98 | 110 | | | 10 | 46 |
| 2 | 2.7 | 2.4 | 85 | 91 | 87 | 90 | 101 | 107 | 15 | 36 | 15 | 44 |
| 3 | 2.8 | 2.5 | 85 | 99 | 82 | 94 | 98 | 115 | 12 | 32 | 13 | 41 |
| 4 | 2.8 | 2.1 | 85 | 99 | 78 | 94 | 94 | 115 | | | 9 | 42 |
| 5 | 3.0 | 2.3 | 85 | 99 | 84 | 94 | 99 | 116 | | | 11 | 46 |
| 6 | 3.0 | 2.3 | 85 | 98 | 81 | 95 | 95 | 117 | 13 | 38 | 15 | 46 |
| Comparative Examples: | | | | | | | | | | | | |
| A | 3.0 | 3.0 | 84 | Off | Off | 87 | | | 28 | 49 | 27 | 44 |
| B | 2.4 | 3.8 | 87 | Off | Off | 85 | | | 41 | 41 | 43 | 38 |

EXAMPLE 7

In this example heat-shrinkable tubing was prepared from 2-mil (0.05-millimeter) biaxially oriented, biaxially differentially heat-shrinkable polyethylene terephthalate film that had length and width shrinkages at 150° C. of 15 and 45 percent respectively. A strip of this film 4.6 centimeters wide was cylindrically folded about its longitudinal axis and the circumferentially overlaid edges passed along a cylindrical rod having a diameter of 1.32 centimeters and underneath the hammer of a 400-watt Model 400, ultrasonic sealer made by Ultrasonic Seal, Inc. The hammer was oscillated at 45-percent power at a frequency of 20,000 cycles/second through a deflection of 0.3 millimeters, and a 0.018-millimeter amplitude at a force of 1.8 kilograms. Folded film was passed underneath the sealer at a rate of 50 centimeters/minute. When heated at 150° C. this tubing exhibited unrestrained radial and length shrinkages of 45 and 15 percent respectively.

Film can also be prepared by welding radially overlaid edges of cylindrically folded film. The conditions of the ultrasonic sealer operation can be varied substantially and can be used with a variety of biaxially differentially heat-shrinkable films. The rate of feeding the film depends on the power output of the sealer.

What is claimed is:

1. Flexible, tough high-strength biaxially differentially heat-shrinkable film comprising biaxially oriented film of a linear orientable crystallizable heat-settable polymeric ester that is nonfibrillating and has a tensile strength of at least 10,000 pounds/square inch in the mutually perpendicular directions and at 150° C. is heat-shrinkable between 2 and 20 percent in a first of the mutually perpendicular directions and at least about 20 percent in the second direction and heat shrinks in the second direction at least 2½ times the amount it shrinks in the first direction.

2. Film of claim 1 in which the polymeric ester is polyethylene terephthalate.

3. Film of claim 1 that shrinks at 150° C. at least 3 times as much in the transverse direction as it shrinks in the longitudinal direction.

4. Flexible, tough high-strength biaxially differentially heat-shrinkable tubing comprising a thin wall cylindrically formed film of a linear-orientable crystallizable heat-settable polymeric ester that is nonfibrillating and has a tensile strength of at least 10,000 pounds/square inch in the mutually perpendicular directions, and at 150° C. is heat shrinkable between about 2 and 20 percent in the longitudinal direction and at least about 20 percent in the radial direction, and heat shrinks in the radial direction at least 2½ times the amount it shrinks in the longitudinal direction.

5. Tubing of claim 4 in which the linear orientable crystallizable heat-settable polymeric ester is polyethylene terephthalate.

6. Tubing of claim 4 that shrinks at 150° C. at least 3 times as much in the radial direction as it shrinks in the longitudinal direction.

7. Tubing of claim 4 comprising a cylindrically folded film having its edges circumferentially overlaid and ultrasonically welded together.

* * * * *